A. E. SPINASSE.
PROCESS FOR MAKING GLASS OBJECTS.
APPLICATION FILED APR. 12, 1917.
1,241,480. Patented Sept. 25, 1917.
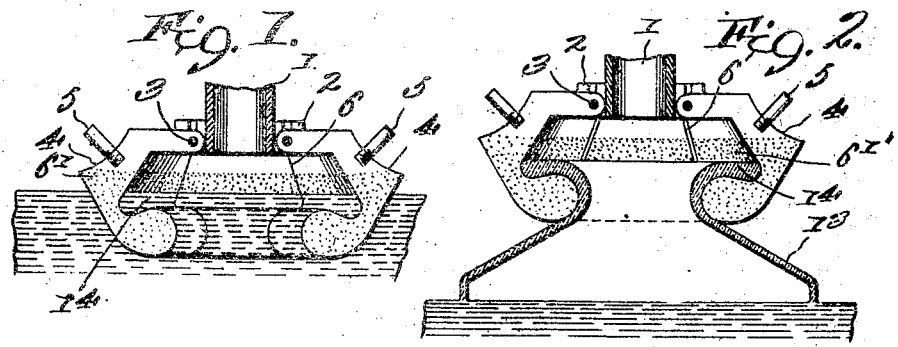
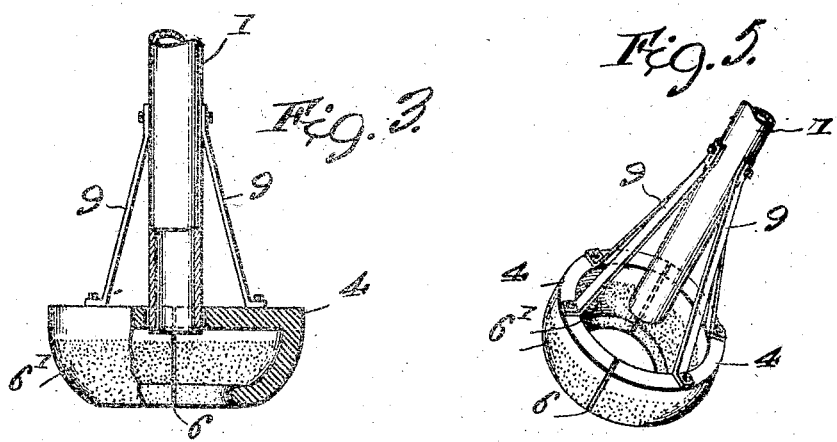
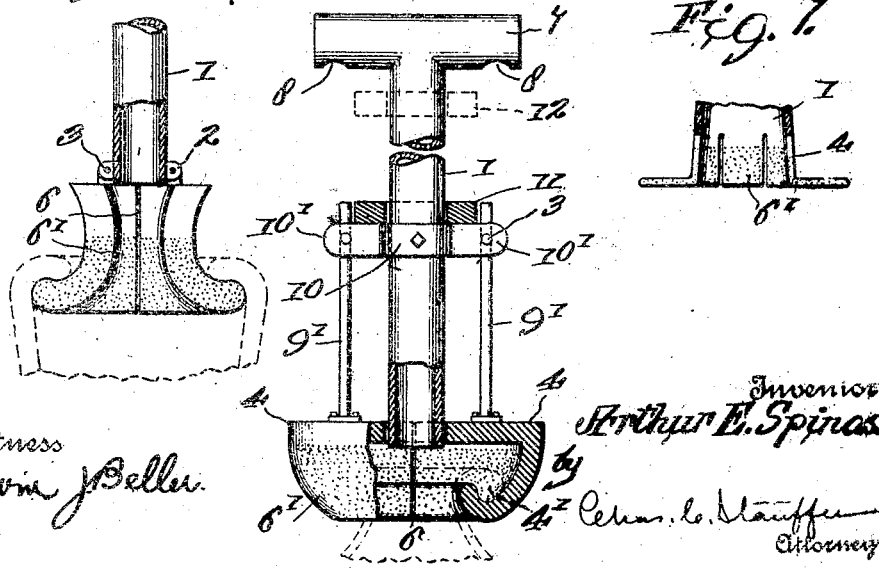
Witness
Edwin J Beller.
Inventor
Arthur E. Spinasse,
by
Attorney

UNITED STATES PATENT OFFICE.

ARTHUR E. SPINASSE, OF MOUNT VERNON, OHIO.

PROCESS FOR MAKING GLASS OBJECTS.

1,241,480.     Specification of Letters Patent.     Patented Sept. 25, 1917.

Application filed April 12, 1917. Serial No. 161,592.

*To all whom it may concern:*

Be it known that I, ARTHUR E. SPINASSE, a citizen of the United States, residing at Mount Vernon, county of Knox, State of Ohio, have invented certain new and useful Improvements in Processes for Making Glass Objects; and I do hereby declare the following to be a full, clear, and exact description of the invention, such as will enable others skilled in the art to which it appertains to make and use the same.

My invention relates to a process for making glass objects, and includes certain steps for preparing and treating baits of any type, used in making such objects, particularly baits of the yielding type such as those shown in my Patent No. 1,170,464, granted February 10, 1916, and in my application Serial No. 75,360, "Process for drawing glass," filed Jan. 31, 1916, in which patent and application my present process is indicated, though not claimed.

My process is generally applicable to the formation of all drawn objects, but is particularly adapted to the production of drawn cylinders of the kind used in making window glass.

The history of glass making, shows that for centuries men made window glass by dipping warmed or heated pipes into melted glass, withdrawing said pipes with lumps of glass adhering to them, blowing a glass bubble, and shaping into sheets, the rod being freed at the proper time by cracking it off. In the earlier glass drawing processes the drawing, whether of cylinders or sheets, was effected, too, with the glass in positive adherence to the bait. The baits were heated either by the glass in which they were dipped or by other means. The difference in expansion coefficients between the iron of the bait and the glass made it possible to continue the draw only while the bait, which had first been heated beyond the adhesion temperature, still with the glass retained a large portion of its heat, as, when they cooled beyond a certain point, the glass would crack off the bait. The heated adherent bait of the kind indicated has always been used at a temperature much below that of the molten glass, the glass novel procured therewith therefore being cooled by losing its heat to the bait with which it is in direct contact, and also in some instances by being exposed to the surrounding cooling atmosphere. In order to delay or retard this cooling, hoods or other means for retarding the cooling, were sometimes used. Later a cold bait process was used to draw cylinders or other objects. While this cold bait process has a number of advantages over previous ones, it is nevertheless attended with several disadvantages, as I shall point out, and my present process enables me to overcome these disadvantages by the use of a warmed or preheated bait and, to an extent, my present process may be considered as a reversion to the ancient method.

My present process involves the employment of several features among which I mention here, the use of a bait warmed to avoid chilling the novel or heated to a temperature at which, when the bait is immersed in molten glass, glass would adhere to said bait. My bait, of course, should not be heated so hot as to cause it to fuse or have its surface injured, or lose its form, or be hotter than the glass; and in any case, allowance must be made for any heat which may be imparted by the glass to the bait, the temperature range being, when the baits are of iron, approximately from 400° F. to 900° F., though I may at times pass these limits. I prevent adherence of the glass when the heated bait is immersed, by previously coating the heated bait with some material which will prevent adhesion of the glass to the bait. At the lower range of temperatures, rosin, tallow, oils and waxes, or compounds of these materials, may be used, and at the higher, powdered lime, magnesia, similar earths, materials, or compounds; but the substance which I have found most suitable in such relation at all temperatures, is lime in the form of paint, whitewash, or some oily emulsion of clay, paint, lime or graphite, which may be in powdered or pasty form. This graphite I rub on and may polish.

I may apply my coating in the form of an emulsion like whitewash, or as paste or powder, and those ingredients that I use, I preferably apply in such a way that they will not separate from the bait when the bait is immersed, and thus cause marring or pollution of the glass, though some materials, such as lime, may not be injurious to the glass. I do not restrict myself to materials of any particular kind. I may apply my coating by spray, brush or trowel, by dipping, in fact, in any suitable way, and I may shape or mold the coating into the form of an envelop, in some instances, and slip it on the bait. I may put my coating on before warming or heating the bait, but it is best applied after. I want to be understood as covering both forms of procedure in my claims. I may develop on the metallic bait, a non-adhering coating or oxid.

Several applications of whitewash will afford a coating that is reasonably permanent. A graphite coating may require rather more frequent renewal.

The coating keeps the glass from contact with the bait at all times, and prevents adhesion of the glass to the bait. This enables me to use my bait warm, and such use is attended with several advantages. One of these advantages is that the glass novel is not chilled or quickly solidified, but remains substantially plastic and formable, gradually and naturally setting under drawing temperature condition with thinner walls and greater molecular stability than when a cold bait is used to chill a novel; thereby procuring a novel the surface layer of which is not under great tension, and is strong enough to support a full length cylinder. This permits me to blow outwardly without danger, the bait having an annealing effect on the novel.

It is well known that sudden chilling of a mass of glass, creates in and near the surface portion of said mass, rupturing strains, because said surface portion is chilled so suddenly that its molecules do not have time to adjust themselves to the mass within, which, cooling more slowly, has a tendency to set or harden in a minutely different volume. If any part of the surface portion gives way, the strain is at once relieved and the glass breaks at once into fragments. When a cold bait is used, with the glass in loose contact therewith, any movement of the glass with respect to the bait, tends to produce friction or other disturbance of the skin of the novel, and this leads to rupture or crumbling of the suddenly chilled novel and of any attached cylinder, with consequent loss of material and labor.

In those instances in which a bait of a yielding or resilient type is used, and in which there is no relative movement between the novel and the bait, much of the loss due to this cause is avoided; but there are still occasions when ruptures, sometimes called in the glass art "burstings" or "crack-offs", are liable to occur when the bait is used cold; and in any case, by using my bait in warmed or hot and coated or lubricated condition, I am enabled to form a novel of size compared with the novels made by cold baits, smaller, with thinner walls, and with the surface portions thereof free from the rupturing or snapping off strains induced by too sudden cooling effect of a cold bait.

A bait may become so hot during a draw, that glass will stick to it if it be immersed or brought into contact with molten glass right away after drawing. In my present process I may use my bait for the next draw as soon as a cylinder has been taken down. The bait, which still retains most of its heat, is removed from the cylinder, coated or smeared if necessary, returned to the drawing frame, and used at once, or as soon as the bath of glass, which may be in a pot or ring, is again ready for drawing. Heretofore a large number of baits were provided for each drawing station, and each was set aside, and subjected to a cooling fan, or other means, for cooling before using again, resulting in loss of time and labor, and in other wastes.

To attain desired temperature the bait may be suspended directly over the glass, or may be heated by supplementary means, but it will usually acquire enough heat while it is over the glass, or immersed in the glass to supply the waste. Repetition of the drawing act generally brings my bait to a comparatively stable temperature, i. e. one in which loss by radiation and conduction (or convection) keeps equal to the gain by each immersion and draw. This stable temperature may be high enough to cause the glass to stick to the bait unless the bait is protected in the manner indicated, but enables me to dispense with a multitude of baits waiting to cool, such as are necessary when a bait is used cold in the cold bait process, in carrying out which process the problem is always to keep the bait from sticking, and the problem is solved by using them cold. In my present process I solve the "sticking" problem of a warm or hot bait, by keeping it coated with an adhesion preventing substance or lubricant. Of course, however, I reserve the right to use as many baits as may be found necessary, that depending upon the weight or thickness of the bait in practice in connection with the temperature drawing conditions, so as to keep the bait properly warmed or heated.

My bait may be made of a material, such as cast iron or nickel-steel, to which, when not coated, glass has a tendency to adhere when the bait is heated. It may be of any suitable weight and thickness of wall, and these conditions may vary much, as is evident. When I use my sectional bait, the sections may expand or contract individually, but the bait, as a whole, does not change its dimensions, except as these dimensions are changed to follow and accord with corresponding changes in the novel, or initial portion of the article being drawn. The temperature when iron or other oxidizable metal is used, should preferably be kept below the point of oxidation. I may, however, use a metal which will not oxidize or deteriorate greatly in use, such as chrome steel, or other steel alloys. I am, of course, not limited to metals, or in fact to material of any kind.

I desire to call attention here to the fact that by the use of coatings such as those indicated above, the active surface of my bait and, of course, the bait itself, is protected against the pitting or eroding action of the glass, whereby the baits are made to last quite a long time, in fact indefinitely. At the same time it should be noted that I may find it advantageous at times, to develop from the substance of the bait itself a coating of oxid or other compound of the metal, upon the active surface of the bait, which coating also serves as an adhesion preventing lubricant or coating. While it is usually desirable that the coating extend to all glass contacting surfaces, there may be occasions wherein such surfaces need not be completely covered, owing to various causes, and I desire that my process be understood as applicable to such cases as well as to those in which the covering is made complete.

In carrying out my process I make use of an apparatus of the form shown in the accompanying drawing, though of course I am not limited to a bait of that particular kind in which:

Figure 1 shows in central section, a sectional bait with the sections closely adjacent, there being several sections.

Fig. 2 shows a similar section of said bait after draw has begun.

Fig. 3 shows a bait in partial section, with oscillating spring-mounted sections.

Fig. 4 shows in partial section, an oscillatable sectioned bait with the glass novel intercoupled with or engaged by said bait.

Fig. 5 is a perspective view showing another means of supporting sections, having an open top.

Fig. 6 shows in partial section a hooked bait with exterior hooks.

Fig. 7 is a sectional detail of another form.

I may employ, as shown in Figs. 1 and 2, a pipe 1 with socketed ears 2 for the support of pins 3 of gravity sections 4. These sections are mounted as shown in Figs. 1 and 2, to have a common center, and are of a form to produce a pocket for the retention and support of a novel. Each section may be provided with a handle 5, and there may be slots or openings 6 between successive sections.

In both Figs. 1 and 2 the bottom surface of the bait inside, is either flat or very slightly inclined, and the novel may change size without changing its position on the bait, the sections of which are free to follow the expanding and contracting movements of the novel formed thereon and which they carry.

In carrying out my process as indicated in Fig. 1, after being warmed or heated and treated with a substance 6' adapted to prevent adhesion of the bait to the glass, and preferably erosion and material loss of novel heat to the bait, the bait is dipped slowly in molten glass as shown, then gradually raised, supporting a slightly cooled ring or disk of glass 14 on the inner wall of the bait, air pressure being preferably introduced through pipe 1, to expel the center core of said disk and for blowing the shoulder 13 and cylinder supported thereby, and extending upward from the mass of molten glass below, though gravity and the pull of the core of glass may be sufficient to effect part or all of this.

In Fig. 4 I show the pivotally hung sections somewhat more hook-shaped, whereby the inner sections of the sections 4 of the bait and the fingers 4' of the novel are securely intercoupled to move together. The sections of this Fig. 4 are suspended from collar 10 so as to swing free in either direction. The weighted ring 11 serves as a stop to limit the swing and keep the sections together loosely, and when ring 11 is elevated as shown by dotted line 12, said sections may be swung open by means of arms 9' so as to free the glass novel.

The bait handle is shown with a T-shaped top 7, the arms of which are provided with openings 8, communicating with a source of air supply. The sections are held suspended by rods 9' from a collar 10 surrounding and attached to the pipe 1, said collar provided with arms 10' and bearings 3. When I employ a split bait having swinging sections, I prefer to adjust said sections so that when they are suspended, they may hang free from each other, i. e. without actual contact, whereby these sections may move toward or from each other to conform to change in size of the novel without friction. In general, the supporting arms 9' are so arranged as to be in line with the center of gravity of a section whereby the sections hang or are supported with their meeting edges perpendicular and the slits between them of uniform width, though the sections may, of course, contact at times.

In Fig. 3, I show in partial section a bowl-shaped close-topped and open bottomed bait, the air pipe 1, entering through an opening in the top and discharging into the interior of the bait in the direction of the central opening in the bottom of the bait. The spring arms 9, which support the sections of the bait, keep said sections in proper position but permit them to yield.

In this figure I show, as in other figures, the outer surface so conformed as to shed or turn aside the glass, being aided in this by the coating or adhesion preventing lubricant 6'. No retention of glass upon the outer part is possible with a bait of the contour shown, and no adhesion is possible on the outside because of the lubricating or adhesion-preventing coating.

I show in Fig. 5, in perspective, a bowl-shaped open-topped bait, having a glass admitting opening in its bottom, said bait provided with supporting arms 9 attached to pipe 1. The pipe 1 is shown in a center position to discharge air through the lower center opening of the bait, the novel forming in this case by being exposed throughout the draw to the cooling atmosphere.

In Fig. 6 I show a sectional bait provided with out-turned hooks, whereby the novel is engaged on its interior. The slits 6 provided between the sections of the bait permit the bait to yield sufficiently to compensate for inequalities of expansion and contraction. The slits are too narrow to permit the molten glass to enter them, and though my lubricant may tend to fill these cracks or slits somewhat, particularly when a bait of the form of Fig. 7 is used, this does no real harm in checking the freedom of movement of the bait sections, and if the accumulations of blacklead or lime or other material should become too thick, the slits may be cleared easily by running a wire or blade (Fig. 7) through them, or by opening the sections apart and scraping clean. The sections may be in contact in some cases.

In Fig. 7, I show the bait made of spring metal, the pipe 1 and sections 4 being integral.

I indicate upon the surface of the bait the coating 6' of graphite, lime or other suitable material. This coating should, of course, extend to all submerged surfaces at least.

By using a bait of the yielding type, coated as described, I am enabled to blow my glass cylinders much faster and without the usual danger of breakage incident to the use of the cold solid bait, because of the fact that the bait yields to the glass, and because the bait though heated, will not adhere to the glass. The coating prevents schrenning or cracking of the glass also by preventing loss of heat from the novel. The coating may be of any desired kind and thickness, and, as indicated, should preferably have adhesion-preventing and heat-insulating qualities. The bait is immersed into the glass bath to a depth such as indicated in Fig. 1, so as to permit the glass to flow in the bait and be exposed to the atmosphere while visible to the operator. The operator will notice the glass or novel changing color as it gives up its heat to the atmosphere, and will raise the bait supporting the partially cooled novel in accordance to judgment determined by the color.

In carrying out my process, I first warm my bait to avoid chilling a novel, or heat my bait to, say, a glass-adhering temperature, apply the coating as far as is necessary, lower the bait, form the novel head and draw, blowing the cylinder while drawing, the dipping, blowing and drawing being usual steps in this art.

My bait may be made of any suitable material, metal being preferable. Its shape, size, weight and structure may be varied at will. Though I have shown a bait of yielding type, I do not wish to be restricted thereto, as it is obvious that my coating will permit the use of a bait of any kind or type, with the advantages I have pointed out, of non-adherence of the glass novel supported to the bait, non-escape of heat from the novel to the bait, forming the novel by gradually cooling under natural cooling drawing conditions, or by direct and unimpeded exposure of the novel to the atmosphere, and, in general, to the usual temperature conditions of the drawing zone or station during its gradual acquisition of permanence of form at the initial stage of the drawing and as it draws up the cylinder.

By the word "lubricant" I do not wish to be understood as intending to necessarily imply that the coating material is intended to facilitate movement of the novel upon the bait. There is, under the conditions under which my novel is formed in general, avoidance of such movement. The coating on the outside or non-retentive surfaces of the bait may assist in thrusting or pushing aside from the bait, the glass of the surface of the bath, and in doing this, it may have some of the functions of a lubricant as also in assisting the glass off these non-retentive surfaces of the bait when the latter is lifted.

Having thus described my invention, what I claim as new and desire to secure by Letters Patent, is:

1. The process of drawing glass cylinders, which consists in applying an adhesion preventing coating to glass-contacting surfaces of a hollow bait, dipping said bait of molten glass, forming a novel, and drawing.

2. The process of drawing glass cylinders, which consists in heating a hollow bait to glass adhesion temperature, applying a lubricant to the glass-contacting surfaces of said heated bait, dipping said bait while still heated, in molten glass, forming a novel, and drawing.

3. The process of drawing glass cylinders, which consists in heating a hollow bait to glass-adhesion temperature, applying lime to the glass-contacting surfaces of said heated bait, immersing said bait while still heated, in molten glass, forming a novel, and drawing.

4. The process of drawing glass cylinders, which consists in applying to glass-contacting surfaces of a hollow bait, an adhesion-preventing substance, dipping said bait in molten glass, forming a novel, and drawing.

5. The process of drawing glass objects, which consists in applying to glass-contacting surfaces of a glass engaging bait, an adhesion preventing substance, and drawing.

6. The process of drawing glass cylinders, which process consists in heating a sectional hollow bait beyond the temperature of glass adhesion, applying to glass-contacting surfaces of said bait, an adhesion preventing coating, dipping while the bait is heated, forming a novel, and drawing.

7. The process of drawing glass cylinders, which process consists in heating a sectional hollow bait beyond the temperature of glass adhesion, applying to glass-contacting surfaces of said bait, lime, dipping while the bait is heated, and drawing.

8. The method which consists in coating a pocket bait with an adhesion preventing substance to prevent adhesion of glass, dipping said bait so coated in a bath of molten glass, and drawing with said bait, a non-adherent glass object.

9. The method which consists in heating a pocket bait somewhat beyond the temperature at which glass adheres, applying to the surface of said bait a lubricant, dipping, and drawing.

10. The method which consists in heating a pocket bait somewhat beyond the temperature at which glass adheres, applying to the surface of said bait lime, dipping, and drawing.

11. The method which consists in heating a bait, coating it with a glass adhesion-preventive substance, dipping the bait to form the novel, blowing, and drawing.

12. The method of drawing glass articles which consists in heating a bait, coating it with a glass adhesion-preventive substance, procuring on the bait a non-adhesive novel in drawing relation to said coated bait, and drawing.

13. The method of drawing articles which consists in heating a bait, coating said bait with an adhesion-preventing substance, and drawing.

14. The method of drawing articles which consists in heating a bait, coating said bait with an adhesion-preventing substance, causing said bait to engage in interlocking but non-adhesive relation with the material to be drawn, and drawing.

15. The process of forming glass cylinders which consists in warming a hollow metal bait, coating said bait provided with an interior ledge with an adhesion preventing coating, dipping said coated bait into molten glass, raising said bait, with a ring or disk of slightly cooled glass, resting upon the ledge of said bait, blowing out the center of said ring or disk, while the edge portion of the ring of glass is supported by the ledge of said bait, and continuing to blow and draw to form a cylinder.

16. The method of drawing glass cylinders from a mass of molten glass which consists in coating a heated hollow bowl-shaped, open-bottomed metal bait with a glass non-adherent substance, causing glass to flow into said coated bait where it becomes anchored in the form of a cooled ring upon said coating on the bait interior, introducing air under pressure within the bait, and elevating said bait, while increasing the internal air pressure introduced within the cylinder drawn supported by the ring upon the interior of said bait, and extending upward from the mass of molten glass.

17. The process of drawing glass cylinders, which consists in heating a hollow metal bait, coating the surface of said bait with a glass adhesion preventing substance, dipping said bait in molten glass, forming a novel upon said coating to the surface of the bait, and drawing.

18. The method of drawing glass cylinders with a sectional bait forming a bottom-opened chamber of a resilient character, which comprises heating said bait, coating the glass-contacting surfaces of said bait with a lubricant or adhesion-preventing substance, producing with the aid of said bait, a non-adherent plastic novel, forming said novel while plastic to maintain relative supporting relation between the novel and bait, and as the glass sets in more or less annealed condition, drawing the cylinder.

19. The process of drawing glass objects which consists in applying to glass-contacting surfaces of a glass-engaging bait, an adhesive-preventing and heat-insulating material, and drawing.

20. The process of drawing glass objects which consists in applying to glass-contacting surfaces of a glass-engaging bait, an adhesion and erosion preventing and heat insulating material, and drawing.

21. The process of drawing glass cylinders, which process consists in warming an open-bottomed bowl-shaped bait, coating said bait with a substance adapted to prevent adhesion of the glass to the bait, procuring in said bait so treated, a novel from a bath of glass, and drawing the cylinder.

22. The process of drawing glass objects which consists in applying to glass contacting surfaces of a glass engaging bait, an adhesion and erosion preventing substance which is also heat insulating, procuring a novel in said bait and permitting the novel to cool by subjecting it to the heat absorbing effects of the surrounding atmosphere, while it is protected by said coating from heat absorbing effects of said bait, and drawing.

23. The process of drawing glass cylinders which consists in warming a hollow bait to a temperature at which it may permit annealing of a novel, rendering said bait non-adherent to the glass, procuring by means of said bait, from a bath of molten glass, a non-adhesive annealed novel, and drawing.

24. The process of drawing a glass cylinder by means of a bowl-shaped metal bait having a bottom opening to receive the glass, which consists in heating the bait so that it will not chill a novel, conditioning it so that it will not adhere to a novel in the drawing process, dipping the bait in such condition into molten glass to procure a novel exposed to the cooling atmosphere, and drawing the cylinder under air pressure.

In testimony whereof, I affix my signature.

ARTHUR E. SPINASSE.